United States Patent
Barrena

[11] Patent Number: 6,135,013
[45] Date of Patent: Oct. 24, 2000

[54] PRESSURE COOKER WITH SAFETY DEVICE TO PREVENT THE LID FROM TURNING

[75] Inventor: Joseba Barrena, Mondragon, Spain

[73] Assignee: Fagor, S. Coop., Mondragon, Spain

[21] Appl. No.: 09/448,918

[22] Filed: Nov. 23, 1999

[30] Foreign Application Priority Data

Dec. 7, 1998 [ES] Spain .................................. 9803103 U

[51] Int. Cl.[7] .......................... A47G 27/08; A47G 27/09; B65D 45/00; B65D 45/34
[52] U.S. Cl. ........................ 99/337; 99/403; 220/203.01; 220/293; 220/316; 220/325; 220/393
[58] Field of Search ............................. 99/330, 331, 337, 99/338, 339, 340, 342, 403–418; 126/369, 377, 378, 373, 374, 388, 389; 220/314, 203.01, 316, 319, 293, 324, 325, 393, 287, 912; 292/256; D7/391, 538

[56] References Cited

U.S. PATENT DOCUMENTS

| | | | |
|---|---|---|---|
| 5,293,813 | 3/1994 | Schultz | 99/337 |
| 5,297,473 | 3/1994 | Thelen et al. | 99/337 |
| 5,613,424 | 3/1997 | Chameroy et al. | 99/403 X |
| 5,678,721 | 10/1997 | Cartigny et al. | 220/316 |
| 5,927,183 | 7/1999 | Lee | 99/337 |
| 6,019,029 | 3/1994 | Chan | 99/337 |

*Primary Examiner*—Timothy Simone
*Attorney, Agent, or Firm*—Pro-Techtor International Services

[57] ABSTRACT

A pressure cooker with a safety device to prevent the lid from turning includes a lid handle and a cooking pan handle. The safety device is built-in to the lid handle, and includes a locking mechanism, a vertical sliding pushbutton that actuates a locking member, a residual pressure valve, and a cooker closed condition indicator rod. The pushbutton exerts pressure on a rocker, which moves the locking member horizontally over two opposing slope ramps in the surface of the locking member.

2 Claims, 1 Drawing Sheet

PRESSURE COOKER WITH SAFETY DEVICE TO PREVENT THE LID FROM TURNING

The present invention relates to the control and safety devices of a domestic pressure cooker.

BACKGROUND OF THE INVENTION

ES-2053186 (EP-0489012) discloses a pressure cooker of the type with two superimposed handles, the lid one and the pan one, which has a safety device actuated by means of an operating button that slides towards a locking member provided with a pin which engages in an outward bent rim of the pan. The locking pin is held engaged by means of the force of a coaxial spring. A valve stem lifted by the pressure in the pan stops the locking member from being retracted, so the lid cannot be turned as long as there is any residual pressure in the pan. The locking device also prevents the pressurizing of the cooker in the event of the two handles not being aligned properly because in that case the locking member cannot be moved forwards to engage with the pan. To open the cooker after cooking, the valve stem drops under its own weight from its lock position and the operating button can then be retracted, the lid handle disengages from the pan and the lid can be turned for opening. The locking member of the known device is housed inside the lid handle and it is L-shaped with the long arm arranged horizontally, which obstructs the valve stem in the "release", condition and prevents it from rising.

DE-2705712 discloses a lid locking device on a pressure cooker comprising an actuating button and a mechanism for transmitting the movement to the locking member, which is pivoting.

DE-3623546-A discloses a pressure cooker with a safety device housed in the handle, which has a vertical sliding pushbutton provided with a return spring and a mechanism for stopping the lid from turning through the assistance of a valve cone for pressurizing the cooker pan. The lock actuating member pivots under the pressure of the pushbutton, and it has two ends, one of which engages on the pan rim so that the lid is left free to turn, while the other end is connected directly to the valve cone, for raising it from its seat and the consequent depressurizing of the pan.

SUMMARY OF THE INVENTION

The object of the present invention is a domestic pressure cooker with a safety device to stop the lid from turning and prevent the opening of the cooker as long as residual pressure remains, as defined in the claims.

The pressure cooker is the upper and lower superimposed radial handle type, which has an actuating button with vertical movement in the lid handle and a mechanism with a horizontally sliding locking member operated by the button, which, with the assistance of a valve body that rises, prevents the lid from turning as long as there is any residual pressure in the pan. The safety device prevents the pressurizing of the pan, until the two handles are perfectly aligned one above the other.

The operation that is carried out by means of the button and the locking mechanism according to the invention, both for locking the lid to prevent it turning and for releasing it, is the same in both cases, since in either operation the button will push the locking member in the direction opposite to the direction it was moved in the previous operation. The button always remains up after performing a locking or releasing operation, and its vertical movement is achieved with a light pressure of the finger and it is converted afterwards into simple horizontal translational movement of the locking member by means of a pivoting transmission member linked to the button. The lid turn locked condition is identified by a visible rod, which is raised by the action of the locking member.

The locking member also incorporates a vertical stop plate, to prevent releasing backward movement, with the assistance of the excess pressure safety valve body, utilizing the fact that this is raised above the lid of the cooker, while it also includes a retractable catch, which prevents the movement of the locking member for the pressurizing of the pan, until the two handles are fully superimposed.

The configuration of the pushbutton, of the locking member and of the pivoting transmission member simplify the construction of the safety device, assembled in this way with three moulded plastic pieces and housed wholly in the lid handle, without any of them protruding.

DETAILED DESCRIPTION OF THE INVENTION

Figure 1:
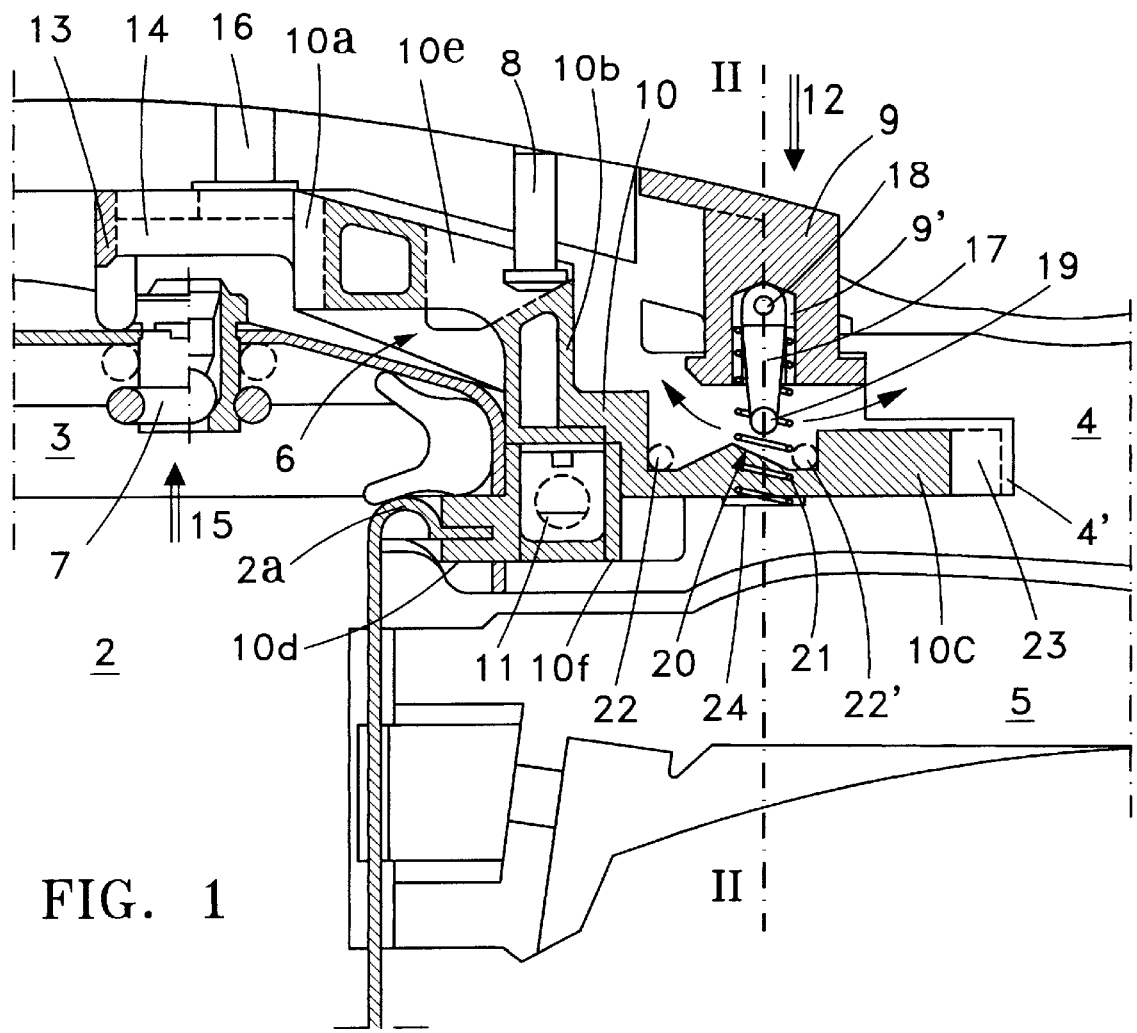
FIG. 1 is a partial sectional view of the pressure cooker with a safety device to prevent the opening of the cooker, according to the invention.
Figure 2:
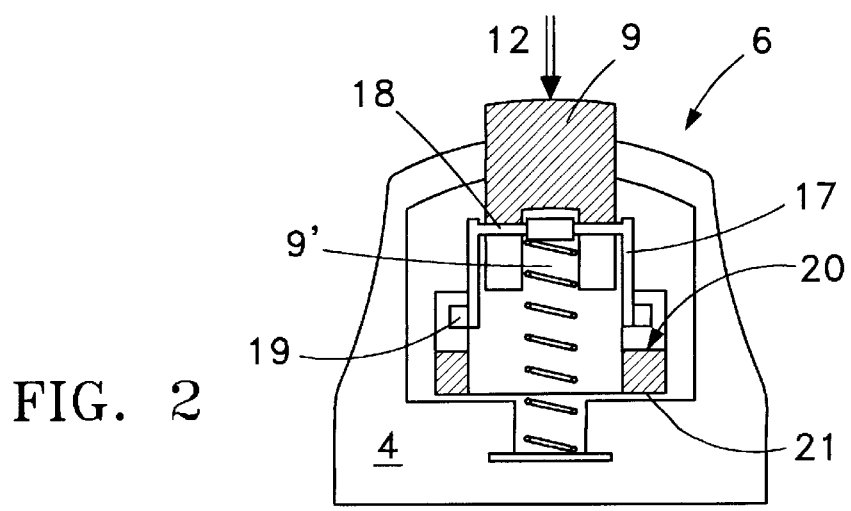
FIG. 2 is a sectional view of the safety device according to II—II of FIG. 1.

With reference to FIGS. 1 and 2, a preferred embodiment of the pressure cooker according to the invention comprises the cooking pan 2, the cooker lid 3, an upper lid handle 4 and a lower pan handle 5, and a safety device that locks the opening of the cooker, which comprises a built-in locking mechanism in the lid handle 4, a residual pressure valve 7, and a rod 8 indicating the locked condition of the cooker.

The locking mechanism 6 comprises an operating pushbutton 9, a locking member 10, a rocker 17 for transmitting the movement of the button 9 to the locking member 10 and a catch 11, which assures that handles 4 and 5 are fully superimposed. The locking member 10 is housed in an internal cavity 4' in the upper handle 4, and it is shaped in the form of a double "L", with a vertical arm 10b and two horizontal arms 10a and 10c, front and rear respectively, extending radially from the vertical arm 10b each in the opposite direction to the other, and in addition it has a tab 10d issuing from the bottom of the vertical arm 10b in direction towards the pan. The catch 11 is retractable within a front projection 10f of the locking member, and it has an internal spring which keeps it jutting out, thereby preventing the locking member from being moved. Now the valve 7 cannot be lifted and the steam will escape via an outer discharge duct 16.

The condition required to carry out the locking operation is that, after completing the lock turn of the lid 3 to start cooking, the handles 4 and 5 are aligned and catch 11, being pressed by a surface jutting out from the lower handle 5, is retracted, while in the meantime it can push the locking member 10 forward. The tab 10d will now move forward with the locking member 10, which is pushed by button 9 to interlock with the horizontal bent rim 2a of the pan and thereby assures the locking of the lid 3. The condition of the safety device shown in the figure is that of the cooker with the lid locked but still not pressurized, ready for the start of cooking. The raised stem 8 indicates the lock condition. The valve body 7, which passes through a hole in the lid 3, is still dropped, but it can now be raised according to arrow 15 by steam pressure and it will seal this lid hole in the steam discharge duct. When the valve body remains up 7, its end is housed in a recess 14 in the front arm 10a of the locking member, behind a vertical stop plate incorporated into the latter, which comes up against the raised valve body 7, thereby preventing the locking member 10 from being retracted for release. The stem 8, which emerges from the upper handle 4 to indicate the lock actuated condition, is supported on the sloping base of a surface cavity 10e in the front arm 10a.

The condition required to execute the operation to release the lid 3 after cooking is that the valve 7 has dropped due to absence of pressure in the pan 2. The user presses the button 9 according to the arrow 12, and the locking member 10 is retracted to occupy a position 23, represented in FIG. 1 as a dotted line, disengaging the tab 10d, so that the lid handle 4 is thereby free to turn.

The rocker 17 for transmitting the movement, as shown in FIG. 2, is housed in a cavity 9' in the button and converts the vertical movement 12 of the button 9 into horizontal travel of the locking member 10. The rocker 17 has an inverted U-shape and its vertical arms are kept outside the contour of the button 9 and they pivot around its horizontal spindle 18 supported in a guide in the button 9. These lateral arms of the rocker 17 terminate in two horizontal pads 19 projecting outwards. The rear arm 10c of the locking member has a surface in the form of a ramp 20 on which the two lateral pads 19 of the rocker make contact when the button 9 is pressed to lock the lid or to release it. The ramp 20 has a crest and an opposing sloping surface on either side, forming two end cavities 22 and 22' where the pads 19 rest and on which they exert pressure to move the locking member 10 in one direction or the other.

After an operation is carried out, the button 9 is kept up away from the locking member, as shown in FIGS. 1 and 2, by the force of a vertical coil spring resting on the bottom 24 of the internal cavity 4' of the upper handle. The vertical downward movement according to arrow 12 of the button 9 brings about the contact of the rocker pads 19 with the ramp 20, with the result that they slip towards the surface 22' of the rear cavity of the ramp and they push the locking member 10 outwards to disengage tab 10d. When pressed down for the opposing operation, the button 9 forces the rocker 17 to pivot to the opposite side until the pads 19 occupy the front cavity 22 of the ramp, and they push the locking member 10 towards the pan to engage the tab 10d. The valve body 7 is dropped and the vertical partition 13 encounters no impediment to its forward movement towards the pan 2. The indicator rod 8 climbs the sloping surface 10e and becomes visible.

What is claimed is:

1. A pressure cooker provided with a safety device, comprising;

a pan provided with a lid and an outward projecting rim, an upper handle affixed to said lid and a lower handle affixed to said pan, wherein said safety device comprises;

a pushbutton housed in said upper handle, said pushbutton moves up and down in said upper handle, said pushbutton include a rocker in a central cavity, a locking member housed in said upper handle, said locking member moves horizontally when moved by said rocker of said pushbutton, a valve body which is raised by pressure in an interior of said pan, said valve body prevents movement of said locking member when said valve body is in a locking position, said locking member is affixed to said outward projecting rim of said pan, alignment means to assure alignment between both said upper and said lower handles prior to said engagement of said locking member, a locking member front arm, and a locking member rear arm containing a cavity with a ramped wall therein, said rocker moves on said ramp to impart movement to said locking member; such that said pressure cooker is closed and locked by turning said lid so that said first handle aligns with said second handle, a tab on said locking member is engaged with said projecting rim of said pan, and said valve body is raised by pressure in said interior of said pan, said valve body fixing said locking member in a locked position when said valve body is raised, thereby locking said pressure cooker, and said pressure cooker is unlocked by a user depressing said pushbutton after pressure in said interior of said pan has dissipated so that said valve body drops so that said catch is disengaged from said projecting rim of said pan by movement transmitted through said rocker as said locking member is retracted, thereby releasing said lid.

2. The safety device of claim 1, wherein:

said locking member comprises a front horizontal arm and a rear horizontal arm, and said rocker extends from said pushbutton in a vertical plane, said front arm having a surface for supporting a lock condition indicator rod, and said rear arm containing said cavity with a ramped wall.

* * * * *